United States Patent
Cao (10) Patent No.: US 9,450,889 B2
(45) Date of Patent: Sep. 20, 2016

(54) METHOD, APPARATUS AND SYSTEM FOR PROCESSING FLEXIBLE-RATE SIGNAL

(71) Applicant: Huawei Technologies Co., Ltd., Shenzhen (CN)

(72) Inventor: Shiyi Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 23 days.

(21) Appl. No.: 14/180,066

(22) Filed: Feb. 13, 2014

(65) Prior Publication Data

US 2014/0161462 A1 Jun. 12, 2014

Related U.S. Application Data

(63) Continuation of application No. PCT/CN2011/078477, filed on Aug. 16, 2011.

(51) Int. Cl.
*H04L 12/911* (2013.01)
*H04J 14/02* (2006.01)
*H04J 3/16* (2006.01)

(52) U.S. Cl.
CPC ........... *H04L 47/826* (2013.01); *H04J 3/1652* (2013.01); *H04J 14/021* (2013.01)

(58) Field of Classification Search
CPC .... H04J 3/1652; H04J 14/021; H04L 47/826
See application file for complete search history.

(56) References Cited

U.S. PATENT DOCUMENTS

| | | |
|---|---|---|
| 2004/0156325 A1 | 8/2004 | Perkins et al. |
| 2005/0013296 A1 | 1/2005 | Imazeki et al. |
| 2007/0086479 A1* | 4/2007 | Ling et al. ............... 370/463 |
| 2008/0107418 A1* | 5/2008 | Zhang ....................... 398/98 |
| 2008/0304822 A1 | 12/2008 | Bianchi et al. |
| 2010/0021173 A1 | 1/2010 | Zhang et al. |
| 2010/0034217 A1 | 2/2010 | Zhao et al. |
| 2010/0209107 A1 | 8/2010 | Yin |
| 2010/0226652 A1 | 9/2010 | Vissers et al. |
| 2012/0251106 A1* | 10/2012 | Valiveti .................. H04L 47/34 398/45 |

FOREIGN PATENT DOCUMENTS

| | | |
|---|---|---|
| CN | 101051879 A | 10/2007 |
| CN | 101155006 A | 4/2008 |
| CN | 101355821 A | 1/2009 |

(Continued)

OTHER PUBLICATIONS

Jinno et al. (Introducing Elasticity and Adaptation Into the Optical Domain Toward More Efficient and Scalable Optical Transport Network, M. dinno, T. Ohara, Y. Sone, A. Hirano, O. Ishida, and M. Tomizawa NTT Network Innovation Laboratories, NTT Corporation, 2010).*

(Continued)

*Primary Examiner* — Shi K Li
*Assistant Examiner* — Mina Shalaby
(74) *Attorney, Agent, or Firm* — Slater Matsil, LLP (57) ABSTRACT

The present invention relates to a method, an apparatus, and a system for processing a flexible-rate signal. A signal from a client side is encapsulated to n optical channel data unit ODU signals. The n ODU signals are encapsulated to a flexible optical channel transport unit OTU signal. A nominal bit rate of the flexible OTU signal varies according to a value of n and the n is an integer greater than or equal to 1.

7 Claims, 4 Drawing Sheets

(56) References Cited

FOREIGN PATENT DOCUMENTS

| | | |
|---|---|---|
| CN | 101489157 A | 7/2009 |
| CN | 101682459 A | 3/2010 |
| CN | 101834688 A | 9/2010 |
| EP | 2323285 A1 | 5/2011 |
| WO | 2008077280 A1 | 7/2008 |

OTHER PUBLICATIONS

"Draft revised G.709 for consent," International Telecommunication Union, Telecommunication Standardization Sector, Study period 2009-2012, Study Group 15, TD 95R2 (PLEN/15) Geneva, Sep. 28-Oct. 9, 2009, 262 pages.

Jinno, M. et al., "Introducing Elasticity and Adaptation into the Optical Domain Toward More Efficient and Scalable Optical Transport Networks," NTT Network Innovation Laboratories, NTT Corp., Dec. 13, 2010, 8 pages.

Jinno, M. et al., "Spectrum-Efficient and Scalable Elastic Optical Path Network: Architecture, Benefits, and Enabling Technologies," Topics in Optical Communications, IEEE Communications Magazine, Nov. 2009, 8 pages.

"Series G: Transmission Systems and Media, Digital Systems and Networks, Digital terminal equipments—General, Series Y: Global Information Infrastructure, Internet Protocol Aspects and Next-Generation Networks," Telecommunication Standardization Sector of ITU G.709/Y.1331, Dec. 2009, 218 pages.

"Series G: Transmission Systems and Media, Digital Systems and Networks, Transmission media characteristics—Characteristics of optical components and subsystems," Telecommunication Standardization Sector of ITU, G.694.2, Dec. 2003, 12 pages.

"Series G: Transmission Systems and Media, Digital Systems and Networks, Transmission media characteristics—Characteristics of optical components and subsystems," Telecommunication Standardization Sector of ITU, G.694.1, Jun. 2002, 14 pages.

Chinese Office Action received in Application No. 201180001547.8 mailed May 6, 2013, 7 pages.

Liu, et al., "Progress and Key Technologies of OTN," School of Optical-electronic Information, Jun. 2009, 9 pages. (Partial Translation).

International Search Report and Written Opinion received Application No. PCT/CN2011/078477 mailed Apr. 5, 2012, 10 pages.

\* cited by examiner

ODUflex

METHOD, APPARATUS AND SYSTEM FOR PROCESSING FLEXIBLE-RATE SIGNAL

This application is a continuation of International Application No. PCT/CN2011/078477, filed on Aug. 16, 2011, which is hereby incorporated by reference in its entirety.

TECHNICAL FIELD

The present invention relates to the field of communications technologies, and in particular, to a method, an apparatus and a system for processing a flexible-rate signal.

BACKGROUND

At present, on a WDM (wavelength division multiplexing) network, the spectrum width of a signal is enlarged as a line rate increases. For example, the spectrum width of a 400 Gbit/s signal is generally predicted to exceed 50 GHz. On existing WDM networks, most OADMs (optical add/drop multiplexer) or ROADMs (reconfigurable optical add/drop multiplexer) are set with a 50 GHz spectrum spacing. Therefore, it is generally considered that a 400 Gbit/s or higher-rate signal cannot pass an OADM or ROADM on an existing network.

To solve the foregoing problem, an OADM or ROADM can use the Flex Grid technology. The Flex Grid technology (also referred to as the SLICE or flexible-bandwidth network technology) has become a research hotspot in the industry. The core of this technology is to change a currently fixed spectrum grid (or wavelength spacing, with reference made to ITU-T G.694) into a flexible spectrum grid; that is, a channel of signal may occupy multiple consecutive spectrum grids.

After adopting the Flex Grid technology, the OADM or ROADM uses a flexible-rate/flexible-spectrum-width optical module (transponder) to further improve the fiber spectrum utilization. Using support for OFDM (orthogonal frequency division multiplexing) as an example, the optical module is capable of adjusting the quantity of OFDM subcarriers according to the size of the client-side bandwidth so as to adjust the spectrum width of a line signal and improve the spectrum utilization with help of the control-plane technology.

However, at an OTN (optical transport network, with reference made to the ITU-T G.709 standard) layer, how to encapsulate a client signal, namely, how to implement a flexible-rate OTN signal is a major problem to be solved.

In an existing solution, an OTUk (optical channel transport unit-k, k representing a rate level, and k=1, 2, 3, 4 . . . ) is modulated to a subcarrier. That is to say, a channel of OFDM signal has a data frame format of n×OTUk (n representing the quantity of subcarriers and being an integer greater than or equal to 1).

The existing solution has some problems.

In the existing solution, n OTU/ODU(H) (optical channel data unit (high order)) overheads (with reference made to the ITU-T G.709 standard) are used. Hence, on the management plane, an OTU/ODU(H) overhead needs to be selected as a valid overhead. On an intermediate node, the valid overhead needs to be moved to an OTU/ODU(H) specified by the node. Such processing increases the complexity of management-plane and control-plane design, thereby increasing the difficulty in management and control. In addition, if only one OTU/ODU(H) overhead is selected as the valid overhead, other n−1 OTU/ODU(H) overheads are invalid bytes. In this aspect, the bandwidth is wasted and the bandwidth utilization decreases.

SUMMARY OF THE INVENTION

The present invention provides a method, an apparatus, and a system for processing a flexible-rate signal, thereby implementing flexible-rate signal encapsulation at an OTN layer.

According to one aspect, the present invention provides a method for processing a flexible-rate signal. A signal from a client side is encapsulated to n optical channel data unit ODU signals. The n ODU signals are encapsulated to a flexible optical channel transport unit OTU signal. A nominal bit rate of the flexible OTU signal varies according to a value of n and the n is an integer greater than or equal to 1.

According to another aspect, the present invention further provides a device for processing a flexible-rate signal. An ODU encapsulating module is configured to encapsulate a signal from a client side to n optical channel data unit ODU signals. A flexible OTU encapsulating module is configured to encapsulate the n ODU signals to a flexible optical channel transport unit OTU signal. A nominal bit rate of the flexible OTU signal varies according to a value of n and the n is an integer greater than or equal to 1.

According to another aspect, the present invention provides a method for processing a flexible-rate signal. A flexible OTU signal is decapsulated to generate n ODU signals. A nominal bit rate of the flexible OTU signal varies according to a value of n and the n is an integer greater than or equal to 1. The n ODU signals are decapsulated to generate a signal to be sent to a client side.

According to another aspect, the present invention further provides a device for processing a flexible-rate signal. A flexible OTU decapsulating module is configured to decapsulate a flexible OTU signal to generate n ODU signals. A nominal bit rate of the flexible OTU signal varies according to a value of n and the n is an integer greater than or equal to 1. An ODU decapsulating module is configured to decapsulate the n ODU signals to generate a signal to be sent to a client side.

The present invention provides a system for processing a flexible-rate signal, including the foregoing device for processing a flexible-rate signal and the foregoing device for processing a flexible-rate signal.

It can be seen from the foregoing technical solutions of the present invention that, in the present invention, a signal from a client side is encapsulated to n optical channel data unit ODU signals. The n ODU signals are encapsulated to a flexible optical channel transport unit OTU signal, where a nominal bit rate of the flexible OTU signal varies according to a value of n and the n is an integer greater than or equal to 1. The present invention implements flexible-rate signal encapsulation by encapsulating a flexible-rate signal to a flexible OTU signal, thereby adapting to flexible-bandwidth network requirements, increasing the efficiency of line signal encapsulation, reducing the line bit rate, and improving the transport performance.

DETAILED DESCRIPTION OF ILLUSTRATIVE EMBODIMENTS

The prevent invention provides a method, an apparatus, and a system for processing a flexible-rate signal, where a signal from a client side is encapsulated to n ODU signals; and the ODU signals are encapsulated to a flexible OTU (OTUflex) signal, where a nominal bit rate of the flexible OTU signal varies according to a value of n and the n is an integer greater than or equal to 1.

It can be known from the foregoing technical solutions that, the embodiments of the present invention provide an OTU container for encapsulating a flexible-rate signal, which implements flexible-rate signal encapsulation by encapsulating a flexible-rate signal to a flexible OTU signal, thereby adapting to flexible-bandwidth network requirements, increasing the efficiency of line signal encapsulation, reducing the line bit rate, and improving the transport performance.

It should be noted that the term "include" in the embodiments of the present invention specifies presence of characteristics, integers, steps, operations, elements and/or components, with presence or attachment of other characteristics, integers, steps, operations, components, elements, and their combinations not excluded.

In the embodiments of the present invention, the technical solutions of the present invention are described in details with the transmitting direction on the line side and the receiving direction on the line side used as two application scenarios.

Figure 1:
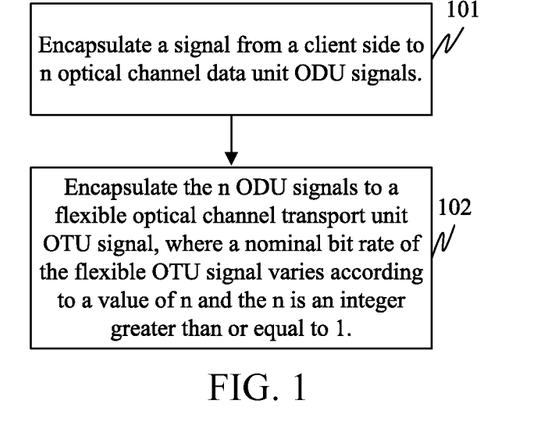
FIG. 1 is a flowchart of a method for processing a flexible-rate signal according to an embodiment of the present invention.

As shown in FIG. 1, an embodiment of the present invention provides a method for processing a flexible-rate signal, with the transmitting direction on the line side being the application scenario, where the method includes:

Step 101: Encapsulate a signal from a client side to n optical channel data unit ODU signals.

Step 102: Encapsulate the n ODU signals to a flexible optical channel transport unit OTU signal, where a nominal bit rate of the flexible OTU signal varies according to a value of n and the n is an integer greater than or equal to 1.

Specifically, in the embodiment of the present invention, a signal from a client side may be an IP (Internet protocol) service, a TDM (time division multiplexing) service, or service of other types. Before being encapsulated to an ODU signal, a signal from a client side may be processed or not processed. An unprocessed signal from the client side can be directly encapsulated to the n ODU signals. In this case, the value of n may be directly configured.

Optionally, when receiving the signal from the client side, corresponding processing may be performed on the signal received from the client side, for example, performing layer 2 forwarding or traffic monitoring on the signal from the client side.

During a traffic monitoring process, traffic information is extracted from the signal from the client side and traffic control information is further determined according to the traffic information of the signal from the client side.

Specifically, traffic control information can be determined according to interaction with a server or other nodes through a preset management-plane or control-plan mechanism. During the process, network and link resource restrictions need to be considered. For example, traffic control information may be determined according to GMPLS (generalized multiprotocol label switching).

In an optional embodiment of the present invention, the method further steps. Traffic control information is determined according to the traffic information of the signal from the client side. Whether the signal from the client side meets a traffic control requirement is determined according to the traffic control information. A signal from a client side that meets the traffic control requirement is encapsulated to the n ODU signals and a signal from a client side that does not meet the traffic control requirement is buffered.

In an optional embodiment of the present invention, the method further includes determining the number n of the ODU signals according to the traffic information of the signal from the client side.

A specific process includes selecting an ODU type and further determining an ODU nominal bit rate corresponding to the ODU type, and selecting a value of n, so that the sum of n ODU nominal bit rates is greater than the allowed traffic volume of the signal from the client side and the sum of n−1 ODU nominal bit rates is less than the allowed traffic volume of the signals from the client side. The allowed traffic volume of the signals from the client side is determined by traffic control information of the signal from the client side.

In the embodiment of the present invention, an ODU signal type may be pre-configured. The ODU signal types defined in the existing ITU-T G.709 standard include: ODU0, ODU1, ODU2, ODU3, ODU4, and ODUflex. Any of the defined ODU signal types may be selected. Apparently, other ODU signal types which may be newly defined may also be used, such as ODU5. In the embodiment of the present invention, the ODU signal type is not specifically limited.

In the embodiment of the present invention, the specific method for encapsulating a signal from a client side to n ODU signals in step 101 is implemented in an existing method. For details, reference may be made to related descriptions in the ITU-T G.709 standard.

Figure 2:
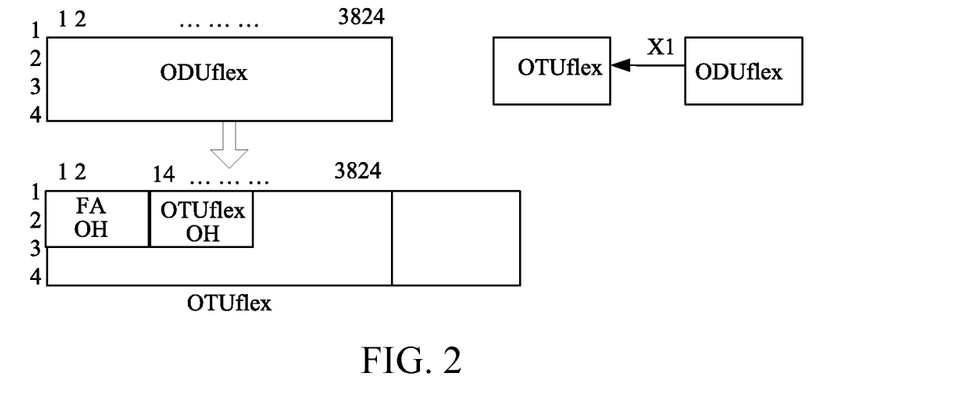
FIG. 2 is a diagram of an application scenario according to an embodiment of the present invention.
Figure 3:
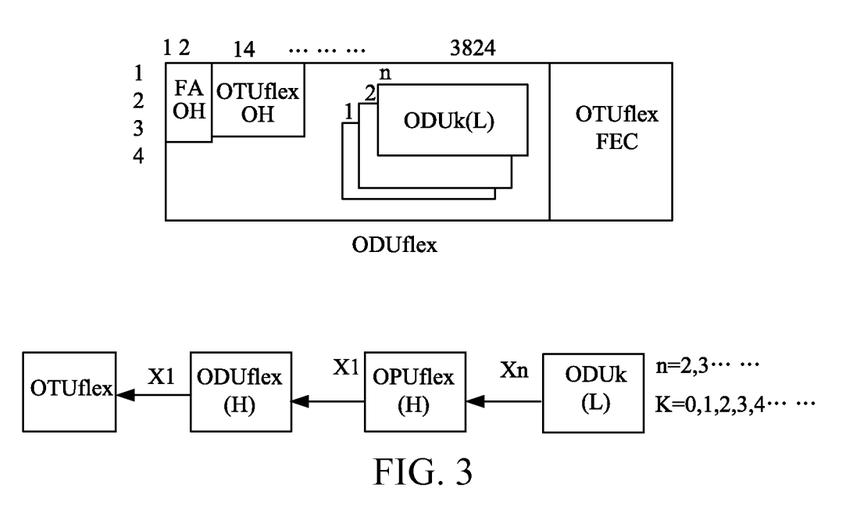
FIG. 3 is a diagram of an application scenario according to an embodiment of the present invention.
Figure 4:
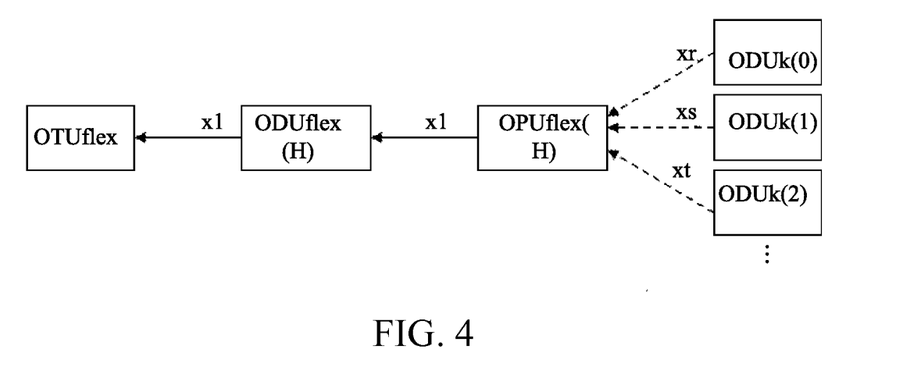
FIG. 4 is a diagram of an application scenario according to an embodiment of the present invention.

In an optional embodiment of the present invention, the encapsulating the n ODU signals to a flexible OTU signal in step 102 may be implemented in any one of the following three manners:

(1) As shown in FIG. 2, a flexible ODU (ODUflex) signal may be encapsulated to an OTUflex signal, where the flexible ODU signal is a specified ODU signal defined in the ITU-T G.709 standard;

(2) As shown in FIG. 3, n ODU signals of a same type may be encapsulated to an OTUflex signal, where n is an integer greater than 1;

(3) As shown in FIG. 4, n ODU signals of different types may be encapsulated to an OTUflex signal, where n is an integer greater than 1.

Exemplarily, for the foregoing solution (1), in the embodiment of the present invention, a signal from the client side may be directly encapsulated to a flexible ODU signal and then the flexible ODU signal is encapsulated to an OTUflex signal, without the need of encapsulating a flexible ODU signal to an OTU signal of several fixed levels. The process of encapsulating a signal from the client side to a flexible ODU signal and the process of directly encapsulating a flexible ODU to an OTUflex signal may be easily deducted with reference made to the ITU-T G.709 standard.

For the foregoing solution (2), multiple low-rate ODUk (L, Low Order, low order) signals of a same type are encapsulated to an OTUflex signal, where k in the ODUk (Optical Channel Data Unit-k) indicates a rate level. The existing ITU-T G.709 standard defines the following rate levels: 0, 1, 2, 3, and 4. The specific encapsulation manner may be easily deducted with reference made to the ITU-T G.709 standard.

It can be seen from the foregoing solution (2), the OTUflex can encapsulate ODU(L)s whose number can be consecutively changed (or randomly changed) and if the numbers of encapsulated ODU(L)s are different, the corresponding nominal bit rate varies. In the existing standard, an OTU signal can only encapsulate a fixed number of combinations of ODUs. For example, an OTU2 can encapsulate 8 ODU0s. Alternatively, an OTU can encapsulate ODU(L)s whose number can be consecutively changed with the need of a mass of stuffing bytes; for example, an OTU2 can also encapsulate 6 ODU0s at the same nominal bit rate as when encapsulating 8 ODU0s.

For the foregoing solution (3), in FIG. 4, r, s, and t are integers greater than or equal to 0. FIG. 4 shows an example of encapsulating a plurality of ODU0s, ODU1s, and ODU2s (other types of ODUs are also applicable) to an OTUflex signal. The ODU0, ODU1, and ODU2 are ODU types defined in the standard ITU-T G.709. The OPUflex (flexible Optical Channel Payload Unit, flexible optical channel payload unit) is an OPU type defined in the standard ITU-T G.709. The specific method of encapsulating ODU(L)s of different types to one OTUflex may be easily deducted from the method of encapsulating ODU(L)s of the same type to one OTUflex, and therefore is not detailed herein.

In an optional embodiment of the present invention, the method may further include performing electrical-to-optical conversion on the flexible OTU signal to generate an optical channel OCh signal. Information can be determined according to traffic information of the signal from the client side. This information can include one or more of transmit clock, modulation baud rate, modulation code type, and signal spectrum position of the OCh signal. The OCh signal can be sent according to the determined information.

It should be noted that the specific manner of determining the information includes: according to traffic conditions, fiber spectrum resource information, and transmission distance, and in combination with the traffic information of the signal from the client side, selecting a nominal bit rate and/or actual bit rate for transmitting the flexible OTU; and then selecting the transmit clock, modulation baud rate, modulation code type, and signal spectrum position of the OCh signal.

Figure 5:
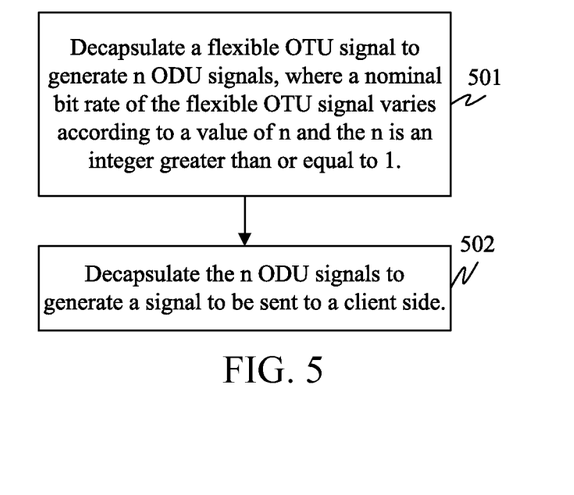
FIG. 5 is a flowchart of another method for processing a flexible-rate signal according to an embodiment of the present invention.

As shown in FIG. 5, in an embodiment of the present invention, the specific process of a method for processing a flexible-rate signal, with the receiving direction on the line side being the application scenario is illustrated as follows.

Step 501: Decapsulate a flexible OTU signal to generate n ODU signals, where a nominal bit rate of the flexible OTU signal varies according to a value of n and the n is an integer greater than or equal to 1.

Step 502: Decapsulate the n ODU signals to generate a signal to be sent to a client side.

In an optional embodiment of the present invention, step 501 may include decapsulating a flexible OTU signal to generate a flexible ODU signal; or decapsulating a flexible OTU signal to generate n ODU signals of a same type, where the value of n is greater than 1; or decapsulating a flexible OTU signal to generate n ODU signals of different types, where the value of n is greater than 1.

In an optional embodiment of the present invention, the method may further include obtaining a channel of OCh signal from the line side and receiving the OCh signal according to one or more of the following information: signal modulation baud rate, modulation code type, and signal spectrum position of the OCh signal.

It should be noted that, the decapsulation method in step 501 in the embodiment of the present invention is a reverse process of the encapsulation method described in step 102 in the embodiment shown in FIG. 1. The process of decapsulating n ODU signals to a signal to be sent to a client side in step 502 is a reverse process of the encapsulation method in step 101 in the embodiment shown in FIG. 1. The specific solution may be directly deducted from the encapsulation method described in the embodiment shown in FIG. 1, and therefore details are not described herein again.

Figure 6:
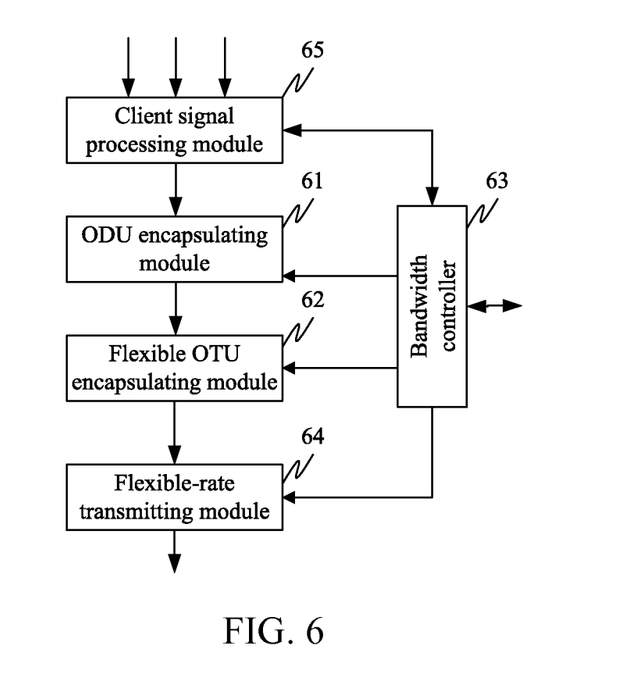
FIG. 6 is a schematic structural diagram of a device for processing a flexible-rate signal according to an embodiment of the present invention.

As shown in FIG. 6, according to the method provided in the embodiment shown in FIG. 1, an embodiment of the present invention provides a device for processing a flexible-rate signal, with the transmitting direction on the line side being the application scenario. An ODU encapsulating module 61 is configured to encapsulate a signal from a client side to n optical channel data unit ODU signals. A flexible OTU encapsulating module 62 is configured to encapsulate the n ODU signals to a flexible optical channel transport unit OTU signal. A nominal bit rate of the flexible OTU signal varies according to a value of n and the n is an integer greater than or equal to 1.

In an optional embodiment of the present invention, the flexible OTU encapsulating module encapsulates the ODU signal by encapsulating a flexible ODU signal to a flexible OTU signal; or encapsulate ODU signals of a same type to a flexible OTU signal; or encapsulating ODU signals of different types to a flexible OTU signal.

In an optional embodiment of the present invention, the processing device further includes a bandwidth controller 63, which is configured to determine the number n of the optical channel data unit ODU signals according to traffic information of the signal from the client side.

In an optional embodiment of the present invention, the bandwidth controller is further configured to determine one or more of the following information: transmit clock, modulation baud rate, modulation code type, and signal spectrum position of an OCh signal.

The processing device further includes a flexible-rate transmitting module 64, which is configured to perform electrical-to-optical conversion on the flexible OTU signal to generate an optical channel OCh signal, and to send the OCh signal according to the information determined by the bandwidth controller.

In an optional embodiment of the present invention, the bandwidth controller is further configured to determine traffic control information, according to the traffic information of the signal from the client side.

The processing device further includes a client signal processing module 65, which is configured to determine whether the signal from the client side meets a traffic control requirement according to the traffic control information, and to encapsulate a signal from the client side that meets the traffic control requirement to the n ODU signals and buffer a signal from the client side that does not meet the traffic control requirement.

It should be noted that, the processing device in the embodiment of the present invention is obtained directly according to the processing method in the embodiment shown in FIG. 1, and includes the same technical characteristics as the embodiment of the processing method. Therefore, for the specific solution involved in the embodiment of the present invention, reference may be made to the related description in the embodiment shown in FIG. 1, and details are not described herein again.

Figure 7:
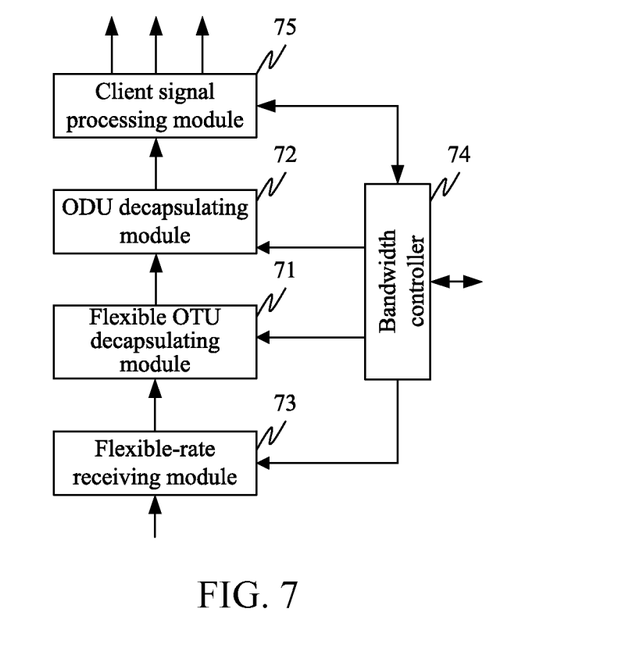
FIG. 7 is a schematic structural diagram of another device for processing a flexible-rate signal according to an embodiment of the present invention.

As shown in FIG. 7, according to the method provided in the embodiment shown in FIG. 5, an embodiment of the present invention provides a device for processing a flexible-rate signal, with the receiving direction on the line side being the application scenario. A flexible OTU decapsulating module 71 is configured to decapsulate a flexible OTU signal to generate n ODU signals. A nominal bit rate of the flexible OTU signal varies according to a value of n and the n is an integer greater than or equal to 1. An ODU decapsulating module 72 is configured to decapsulate the n ODU signals to generate a signal to be sent to a client side.

The flexible OTU decapsulating module decapsulates the flexible OTU signal by decapsulating a flexible OTU signal to generate a flexible ODU signal; or decapsulating a flexible OTU signal to generate n ODU signals of a same type, where the value of n is greater than 1; or decapsulating a flexible OTU signal to generate n ODU signals of different types, where the value of n is greater than 1.

In an optional embodiment of the present invention, the device further includes a flexible-rate receiving module 73, configured to obtain a channel of OCh signal from the line side and receive the OCh signal according to one or more of the following information: modulation baud rate, modulation code type, and signal spectrum position of the OCh signal. A bandwidth controller 74 can be mainly configured to control the flexible-rate receiving module to receive the OCh signal according to one or more of the following information: modulation baud rate, modulation code type, and signal spectrum position of the OCh signal.

Optionally, the bandwidth controller may be further configured to control the flexible OTU decapsulating module, or the ODU decapsulating module, or the client signal processing module to perform corresponding processing of corresponding modules described in the embodiment of the present invention according to one or more of the following information: modulation baud rate, modulation code type, and signal spectrum position of the OCh signal. In another optional situation, the bandwidth controller may further be configured to determine the traffic control information of the transmitting direction, for example, the traffic control information according to the embodiment shown in FIG. 1 or the embodiment shown in FIG. 3 according to interaction with a server or other nodes through a preset management-plane or control-plane mechanism (for example, may be implemented through GMPLS) and according to information such as processing capability fed back by the client signal processing module.

In addition, a client signal processing module 75 can be mainly configured to send, to the client side, the signal to be sent to the client side that is generated through decapsulation by the ODU decapsulating module.

It should be noted that the processing device provided in the embodiment of the present invention is an apparatus claim that is directly obtained according to the processing method provided in the embodiment shown in FIG. 5, and includes the technical solution same as or corresponding to the embodiment shown in FIG. 5. Therefore, the involved technical solution is not described in detail herein.

An embodiment of the present invention further provides a system for processing a flexible-rate signal, including the processing device provided in the embodiment shown in FIG. 6 and the processing device provided in the embodiment shown in FIG. 7.

The processing system provided in the embodiment of the present invention includes the processing devices provided in the embodiments shown in FIG. 6 and FIG. 7, so reference may be made to descriptions in the related embodiments for specific technical solutions, and therefore details are not described herein again.

Implementation of the technical solutions in the embodiments of the present invention can adapt to flexible-bandwidth network requirements, increase the efficiency of line signal encapsulation, reduce the line bit rate, and improve the transport performance.

Persons of ordinary skill in the art may understand that all or a part of the processes of the methods in the embodiments may be implemented by a computer program instructing relevant hardware. The program may be stored in a computer readable storage medium. When the program is run, the processes of the methods in the embodiments are performed. The storage medium may be a magnetic disk, an optical disk, a read-only memory (ROM), or a random access memory (RAM).

What is claimed is:

1. A method for processing a flexible-rate signal, comprising:
    encapsulating the flexible-rate signal from a client side to n optical channel data unit (ODU) signals, wherein the n ODU signals are of a same type and n is an integer greater than 1, wherein a value of n is selected so that a sum of n ODU nominal bit rates is greater than an allowed traffic volume of the signal from the client side and a sum of n−1 ODU nominal bit rates is less than the allowed traffic volume of the signal from the client side; and
    encapsulating the n ODU signals to a flexible optical channel transport unit (OTU) signal, wherein a nominal bit rate of the flexible OTU signal varies according to the value of n.

2. The method according to claim 1, further comprising determining n according to traffic information of the signal.

3. The method according to claim 1, further comprising:
    performing electrical-to-optical conversion on the flexible OTU signal to generate an optical channel OCh signal;
    determining, according to traffic information of the signal, one or more of the following information: transmit clock, modulation baud rate, modulation code type, and signal spectrum position of the OCh signal; and
    sending the OCh signal according to the determined information.

4. A device for processing a flexible-rate signal, the device comprising:
    a processor and a non-transitory computer readable medium having a plurality of computer executable instructions stored thereon which, when executed by the processor, cause the processor to:
    encapsulate the flexible-rate signal from a client side to n optical channel data unit (ODU) signals, wherein the n ODU signals are of a same type and n is an integer greater than 1, wherein a value of n is selected so that a sum of n ODU nominal bit rates is greater than an allowed traffic volume of the signal from the client side and a sum of n−1 ODU nominal bit rates is less than the allowed traffic volume of the signal from the client side; and encapsulate the n ODU signals to a flexible optical channel transport unit (OTU) signal, wherein a nominal bit rate of the flexible OTU signal varies according to the value of n.

5. The device according to claim 4, wherein the computer executable instructions comprise instructions used to cause the processor to determine n according to traffic information of the signal.

6. A method for obtaining a flexible-rate signal, comprising:
   decapsulating a flexible optical channel transport unit (OTU) signal to generate n optical channel data unit (ODU) signals, wherein the n ODU signals are of a same type and n is an integer greater than 1, wherein a value of n is selected so that a sum of n ODU nominal bit rates is greater than an allowed traffic volume of the signal from a client side and a sum of n−1 ODU nominal bit rates is less than the allowed traffic volume of the signal from the client side; and
   decapsulating the n ODU signals to generate the flexible-rate signal.

7. A device for obtaining a flexible-rate signal, the device comprising:
   a processor and a non-transitory computer readable medium having a plurality of computer executable instructions stored thereon which, when executed by the processor, cause the processor to:
   decapsulate a flexible optical channel transport unit (OTU) signal to generate n optical channel data unit (ODU) signals, wherein the n ODU signals are of a same type and n is an integer greater than 1, a nominal bit rate of the flexible OTU signal varies according to a value of n, wherein the value of n is selected so that a sum of n ODU nominal bit rates is greater than tan allowed traffic volume of the signal from a client side and a sum of n−1 ODU nominal bit rates is less than the allowed traffic volume of the signal from the client side; and
   decapsulate the n ODU signals to generate the flexible-rate signal.

* * * * *